June 24, 1930.  J. HELSTROM  1,768,252
DIRIGIBLE HEADLIGHT
Filed May 19, 1927  2 Sheets-Sheet 1
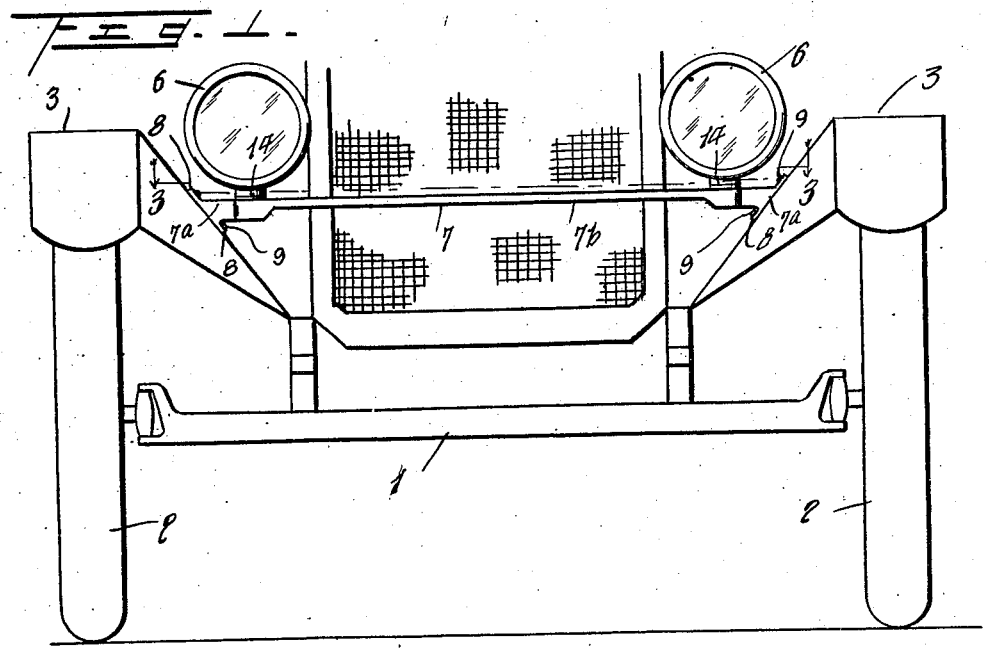
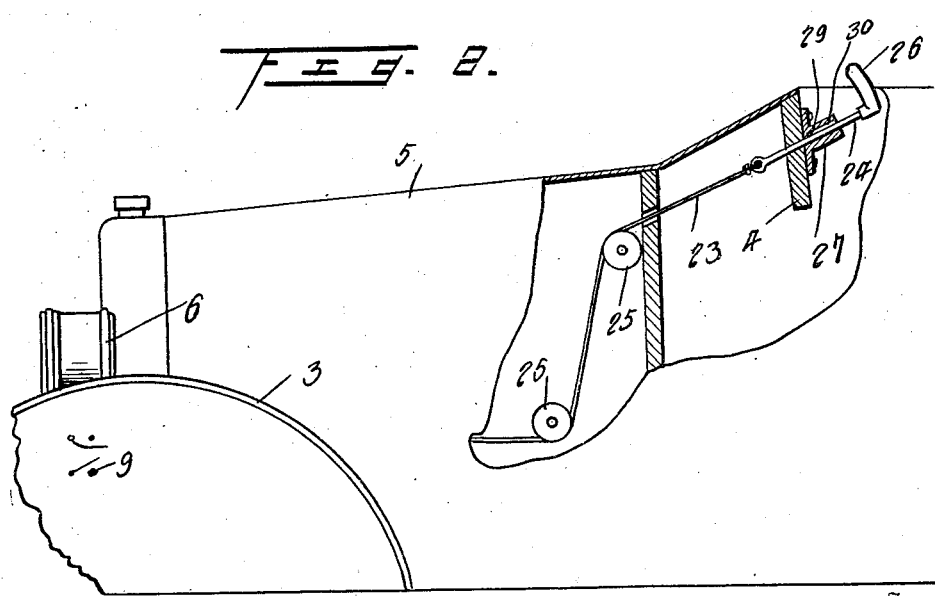
Inventor
J. Helstrom
By
Attorney

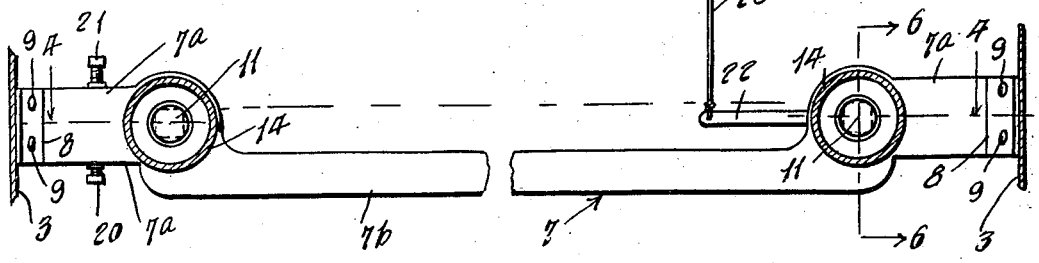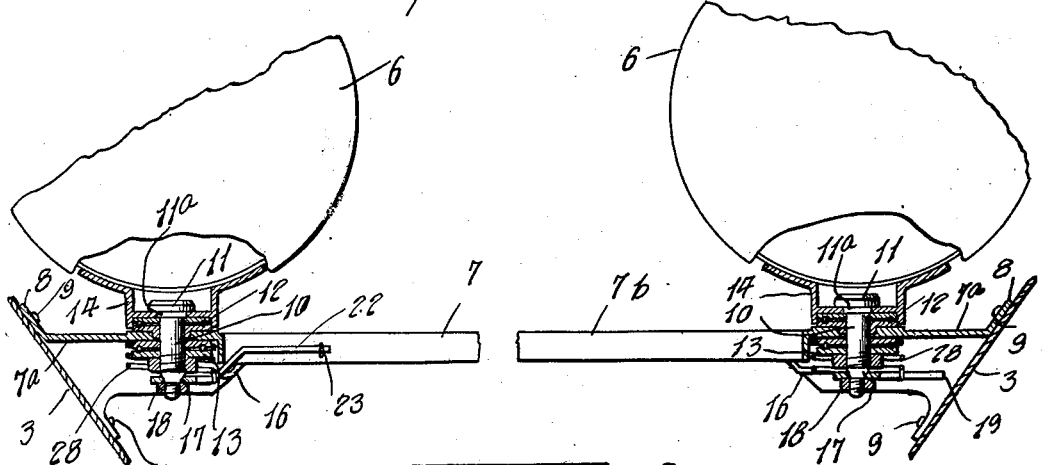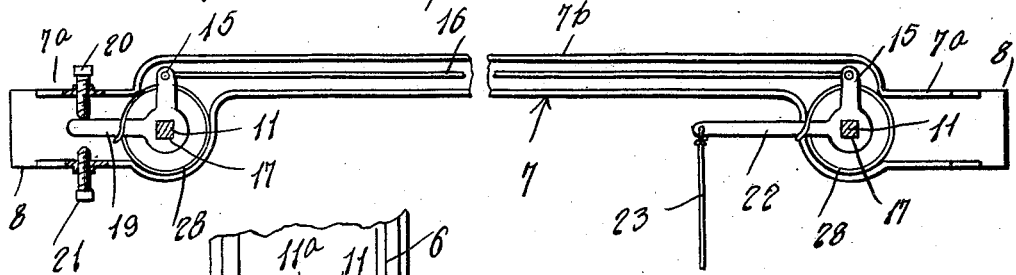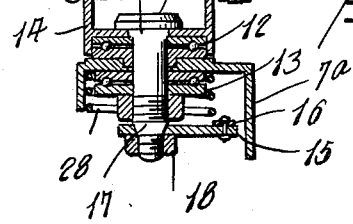

Patented June 24, 1930

1,768,252

UNITED STATES PATENT OFFICE

JULMER HELSTROM, OF VIRGINIA, MINNESOTA

DIRIGIBLE HEADLIGHT

Application filed May 19, 1927. Serial No. 192,654.

This invention relates to a dirigible headlight structure for automobiles, and has for one of its objects to provide a novel, simple and highly efficient structure of this character wherein the headlights are mounted for movement about vertical axes and connected together for simultaneous movement, wherein the headlights are retained in normal position by springs, and wherein the headlights are adapted to be turned from said position by a cable having attached thereto a handle arranged within convenient reach of the driver of the automobile.

A further object of the invention is to provide a dirigible headlight structure of the character stated which shall embody a novel and simple support for the headlights and wherein the support shall be adapted to house the springs and the means by which the headlights are connected for simultaneous movement.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 is a view in front elevation of an automobile equipped with a headlight structure embodying my invention, Figure 2 is a view partly in side elevation and partly in vertical section of the automobile and headlight structure, Figure 3 is a sectional view taken on the horizontal planes indicated by the line 3—3 of Figure 1, Figure 4 is a sectional view taken on the vertical planes indicated by the line 4—4 of Figure 3, Figure 5 is a bottom plan view of the headlight support, the headlight connecting means, and a portion of the headlight operating means, and Figure 6 is a sectional view taken on the vertical plane indicated by the line 6—6 of Figure 3.

Referring in detail to the drawings, 1 designates the front axle, 2 the front wheels, 3 the front fenders, 4 the instrument board, and 5 the engine hood of an automobile.

The headlights 6 of the automobile are supported for movement about vertical axes by a horizontal bar 7 which is secured to and between the fenders 3 with its channel opening in a downward direction. The end portions 7ª of the bar 7 are rearwardly offset, and are provided at their outer terminals with flanges 8 which contact with the fenders 3. Rivets 9 or other suitable fastening elements, which engage the fenders 3 and flanges 8, serve to secure the bar 7 to the fenders. The vertical members of the bar portions 7ª extend below the corresponding members of the main or intermediate portion of the bar 7.

The bar portions 7ª are provided with vertical openings 10 for the reception of pivot bolts 11 through the medium of which the headlights 6 are connected to said bar portions. Upper anti-friction bearings 12 and lower anti-friction bearings 13 are associated with the bar portions 7ª, and are retained in place by the bolts 11. The headlights 6 are provided with standards 14 of hollow cylindrical formation. The standards 14 rest upon and house the anti-friction bearings 12, and are engaged by polygonal portions 11ª of the bolts 11. The bar portions 7ª house the bearings 13 and the lower portions of the bolts 11, and the standards 14 house the bearings 12 and the upper portions of the bolts.

The bolts 11 are provided with forwardly extending arms 15 to the front ends of which a tie rod 16 is pivotally connected. The arms 15 are secured to the polygonal lower portions 17 of the bolts 11 by means of nuts 18. The arms 15 extend into the body portion 7ᵇ of the bar 7, and are housed by said portion. An outwardly directed arm 19 is formed integrally with and arranged at right angles to one of the arms 15. The arm 19 is housed by one of the bar portions 7ª, and its free or outer end works between the inner ends of set screws 20 and 21 which are carried by the vertical members of said bar portion. An inwardly directed arm 22 is formed integrally with and is arranged at right angles to the other arm 15, and secured to the inner or free end thereof is a cable 23 which is also secured to a pull rod 24. The cable 23 passes about direction pulleys 25 supported on the automobile beneath the engine hood 5, and the pull rod 24 is provided at its rear end with a handle 26. The pull rod 24 is supported within convenient reach of the driver of the automobile by a sleeve 27 secured to the instrument board 4. Whenever it is desired to turn the headlights 6 from their normal position, the handle 26 is grasped and pulled rearwardly, the distance that the headlights may be moved in this direction being limited by the arm 19 and the rear set screw 21. The headlights 6 are held in their normal position by coil springs 28 which surround the bearings 13 and are connected to the bar portions 7ª and to the arms 19 and 22. The movement of the headlights 6 under the influence of the springs 28 is limited by the arm 19 and the front set screw 20. The pull rod 24 is provided with a pin 29 which works in a groove 30 formed in the inner wall of the sleeve 27. Whenever it is desired to hold the headlights in their turned position, the pull rod 24 is rotated far enough to carry the pin 29 out of registration with the groove 30, it being understood that when the headlights are turned the pin 29 is withdrawn from the sleeve 27 and that when the pin is out of registration with the groove it contacts with the rear end of the sleeve. To release the headlights 6 for movement back to their normal position by the springs 28, it is only necessary to turn the rod 24 far enough to carry the pin 29 into registration with the groove 30 and then release the rod.

The arm 22 is upwardly offset to permit it to be hidden from view by the body portion 7ᵇ and the adjacent end portion 7ª of the bar 7.

From the foregoing description, taken in connection with the accompanying drawings, it will be understood that the headlights 6 are normally held in a forwardly facing position, and that they may be turned from this position to the right so as to prevent them from interfering with the vision of the operator of an oncoming automobile. It will also be understood that the headlights 6 may be readily left in their turned or adjusted position, and that when released they will be returned promptly to their normal position.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

A dirigible headlight structure comprising a bar provided with an intermediate portion and with end portions of greater width than said intermediate portion and offset laterally therefrom, depending flanges extending substantially throughout the length of both of said portions and having curved parts at the junction of said portions, headlight-mounting spindles journaled at the junction of said portions, return coil springs for said spindles engaging said curved parts and the opposite portions of the flanges whereby the springs are positioned, forwardly extending arms on said spindles, a connection between said arms housed by the first mentioned portion, laterally extending arms on said spindles, one of said arms extending outwardly beyond the adjacent curved parts whereby it may be operated, the adjacent spring being connected to the last mentioned arm and to the bar, the other laterally extending arm being located between the flanges at one of the offset portions, adjustable stop members disposed in the latter flanges coacting with the last mentioned arm, the other coil spring being connected to the last mentioned arm and to the bar.

In testimony whereof I affix my signature.

JULMER HELSTROM.